United States Patent [19]

Pfuhl et al.

[11] Patent Number: 5,738,063
[45] Date of Patent: Apr. 14, 1998

[54] METHOD FOR OPERATING A FUEL INJECTION SYSTEM

[75] Inventors: Berthold Pfuhl, Markgroningen; Rainer Burkel, Asperg; Wilhelm Eyberg, Leonberg, all of Germany

[73] Assignee: Robert Bosch, GmbH, Stuttgart, Germany

[21] Appl. No.: 836,585

[22] PCT Filed: Jun. 5, 1997

[86] PCT No.: PCT/DE96/00985

§ 371 Date: May 14, 1997

§ 102(e) Date: May 14, 1997

[87] PCT Pub. No.: WO97/10423

PCT Pub. Date: Mar. 20, 1997

[30] Foreign Application Priority Data

Sep. 14, 1995 [DE] Germany ............ 195 34 051.5

[51] Int. Cl.⁶ ............................ F02B 77/00; F02M 41/00
[52] U.S. Cl. ................................... 123/198 D; 123/456
[58] Field of Search ........................ 123/198 D, 456, 123/359, 468, 479, 497, 447

[56] References Cited

U.S. PATENT DOCUMENTS

| | | |
|---|---|---|
| 5,201,294 | 4/1993 | Osuka ................ 123/198 D |
| 5,241,933 | 9/1993 | Morikawa ............ 123/198 D |
| 5,417,194 | 5/1995 | Augustin ............... 123/456 |
| 5,433,182 | 7/1995 | Augustin ............... 123/456 |
| 5,441,026 | 8/1995 | Akimoto .............. 123/198 D |
| 5,456,233 | 10/1995 | Felhofer .............. 123/456 |
| 5,476,080 | 12/1995 | Brunnhofer .......... 123/198 D |
| 5,537,980 | 7/1996 | Yamamoto ............. 123/456 |

*Primary Examiner*—Carl S. Miller
*Attorney, Agent, or Firm*—Edwin E. Greigg; Ronald E. Greigg

[57] ABSTRACT

A method for operating a fuel injection system and a fuel injection system for performing the method, in which the fuel is supplied in measurable amounts at high pressure to a high-pressure fuel reservoir, whose pressure is controlled by a pressure control valve and from which fuel is drawn for injection via electrically controlled injection valves. The system is monitored for leakage losses in that the fuel quantity supplied to the high-pressure fuel reservoir by a fuel pump and the quantity removed from the high-pressure fuel reservoir via the injection valves and the pressure control valve are compared with one another, and if these quantities deviate from one another a signal device is tripped, or an intervention into the operation of the fuel injection system is made.

6 Claims, 1 Drawing Sheet

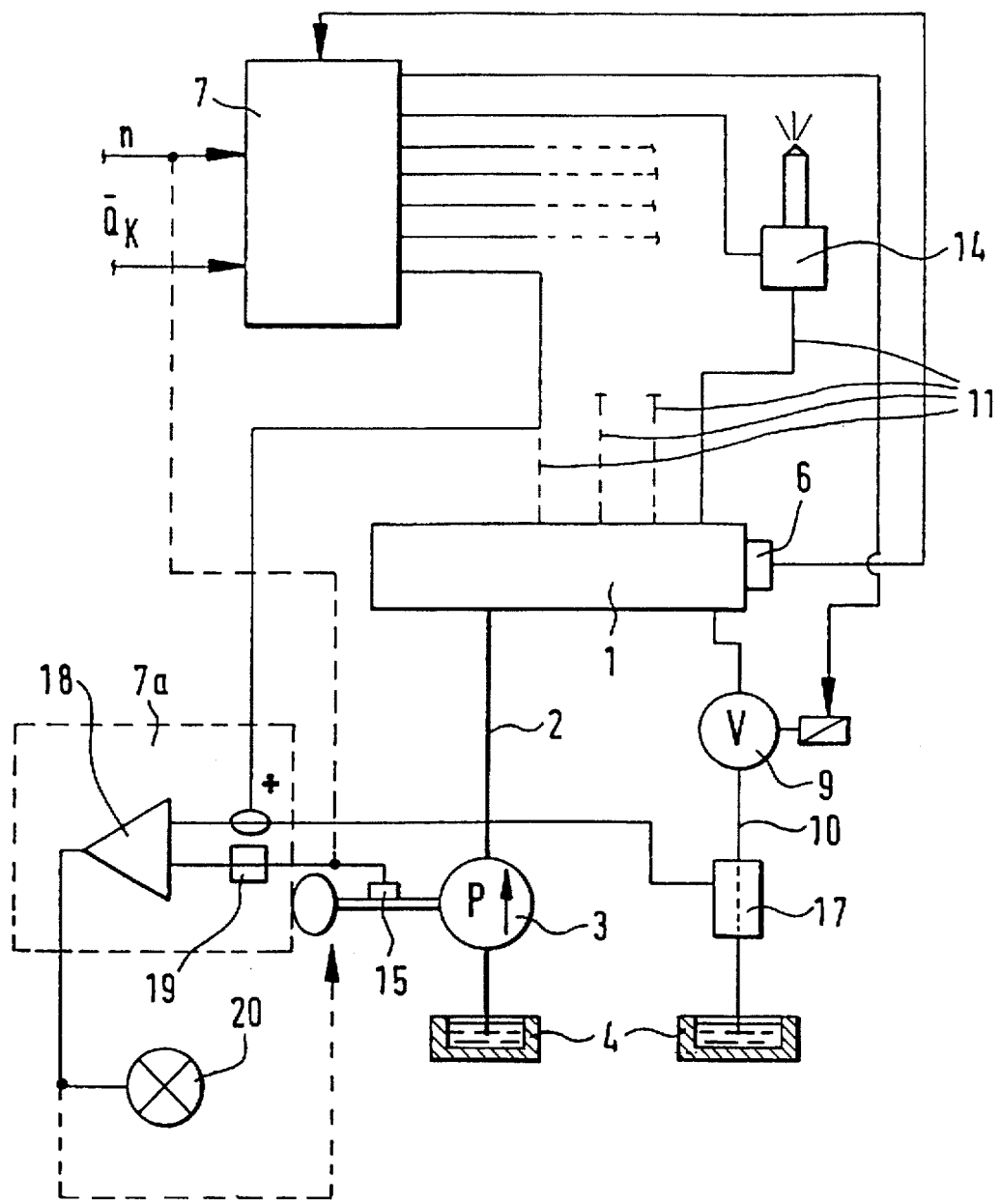

METHOD FOR OPERATING A FUEL INJECTION SYSTEM

PRIOR ART

The invention is based on a method, known from U.S. Pat. No. 5,197,438, for operating a fuel injection system in which the fuel is fed in a measurable quantity at high pressure into a high-pressure reservoir, whose pressure is controlled by a pressure control valve and from which fuel is drawn for injection via electrically controlled injection valves. In the fuel injection system operated in the known way, it can happen that the high-pressure fuel storage system springs a leak, which is especially critical in view of the high injection pressures for injecting fuel in internal combustion engines with externally supplied ignition.

ADVANTAGES OF THE INVENTION

With the method according to the invention for operating a fuel injection system of this generic type, it is now possible to ascertain automatically and exactly when such a known high-pressure system springs a leak, especially in the region of the high-pressure reservoir. If a leak occurs, a warning can advantageously be given, or a suitable intervention into the fuel injection system can advantageously be made in order to avoid further damage.

Especially advantageously, the quantity of outflowing fuel required to regulate the fuel pressure in the high-pressure reservoir is detected by means of a measuring instrument. For a known delivery of fuel brought to high pressure into the high-pressure fuel reservoir, and with a known fuel injection quantity via the injection valves, one obtains an exact balance of delivered and removed fuel, which indicates a deviation between the delivered and removed fuel only whenever there is a leak in the high-pressure reservoir. The quantity fed, which results from the drive rpm of the fuel pump and its constant feed quantity per revolution of the drive shaft, can advantageously easily be detected by means of a control unit, and the necessary signals for controlling the injection valves, which correspond to the injected fuel quantity, are already available.

In an advantageous further feature, a fuel injection system for performing the method is disclosed.

BRIEF DESCRIPTION OF THE DRAWING

An exemplary embodiment of the invention is shown in the drawing and will be described in further detail in the ensuing description.

DESCRIPTION OF THE EXEMPLARY EMBODIMENT

In the drawing, a high-pressure fuel reservoir 1 is shown, which is supplied with fuel, which is brought to high injection pressure, via a supply line 2 from a fuel pump 3 that aspirates fuel from a fuel container 4. Pressures that are substantially above 1000 bar occur in the process. The pressure in the high-pressure fuel reservoir is detected by a pressure transducer 6, whose signal is delivered to a control unit 7, by which, if a fixedly set or desired pressure, which may be dependent on a particular operating state of the associated internal combustion engine, is exceeded, a pressure control valve 9 is triggered by a corresponding signal. This valve is located in a fuel return line 10 from the high-pressure fuel reservoir to the fuel container 4. From the high-pressure fuel reservoir, pressure lines 11 also lead away, each communicating with one fuel injection valve 14, by way of which valve at the appropriate time, a desired quantity of fuel can be injected to the engine. The control of the fuel injection quantity in terms of timing and amount is also effected via the control unit 7, which for purposes of this control receives control signals corresponding to the rpm and the load at which the associated engine is intended to be operated. The control of this fuel injection quantity is effected for instance in a known manner by means of magnet valves, which control the communication between the high-pressure reservoir and the injection valve. Any fuel control quantities that might occur and are capable of flowing back into the tank are likewise returned to the tank via the return line 10.

The fuel pump is for instance driven synchronously with the engine operated by the fuel injection system, or in other words is driven at an rpm that is already detected in order to control the injection. However, the fuel pump may also be operated separately by a special drive mechanism, and in that case the applicable drive rpm of the fuel pump can also be detected, for instance by an rpm transducer 15. With the aid of this drive rpm and of the fact that the fuel pump pumps a constant supply quantity per revolution, it is now possible with the aid of this rpm to detect the fuel quantity delivered to the high-pressure fuel reservoir, so that it is possible to dispense with a measuring device for directly measuring the supplied fuel quantity. But even if the fuel feed pump, for certain reasons, operates with a variable feed volume, the fuel quantity fed by the fuel pump can again be detected from the control signals or by a quantity measuring device.

Since in operation of the fuel injection system with very high pressures, it is critical if leaks occur in the high-pressure system, and in particular in the high-pressure reservoir 1, it is necessary to monitor the intactness of this reservoir. With the aid of the fuel quantity delivered via the feed pump 3 and of the fuel quantity removed via the injection valves 14, in combination with the fuel quantity removed in order to regulate the fuel pressure in the high-pressure reservoir, as well as any control quantities that may occur for the injection device, a balance can now be set up between the delivered fuel and the removed fuel. To that end, however, the fuel quantity diverted via the pressure control valve must be measured by means of a quantity measuring device 17 in the fuel return line 10. The signal corresponding to this quantity, added to a signal corresponding to the total fuel injection quantity in the unit of time, which signal can be output by the control unit, is now compared with the correspondingly prepared signal for the supply quantity of the feed pump 3 from the rpm signal, with the aid of a comparator 18. If there is a deviation between the supplied fuel quantity and the quantity of fuel removed again, then by means of the control device 7a, tripped by the comparator 18, a signal for a gauge or display 20 or for an intervention into the operation of the fuel injection system is output. With this signal, the drive of the fuel pump 3 can for instance be turned off, or the entire fuel injection system in the engine can be stopped or reduced to an emergency-operation mode.

As the quantity measuring device 17, a throttle inserted into the fuel return line 10 can be provided in a manner known per se, and the pressure upstream and downstream of the throttle can then be compared with one another in order, to form a quantity signal from the result. Such measuring devices are described for instance in conjunction with injection systems, in German Patent Disclosure DE-A 37 22 264.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection system comprising a high-pressure feed pump (3), means for driving said high pressure feed pump at a constant feed rate to force fuel under high pressure into a high-pressure reservoir (1), said high pressure reservoir communicates fuel via a plurality of pressure lines (11), one each for fuel injection valve (14), electrically controlled valves, the inflow to the various injection valves (14) being effected through said electrically controlled valves, the high-pressure reservoir (1) moreover being relievable via a fuel return line (10) that has a pressure control valve (9) controlled as a function of the pressure in the high-pressure reservoir, a flow quantity measuring device (17) disposed in the fuel return line (10), said quantity measuring device communicates with a control unit (7, 7a, 18, 19), a device (19) for detecting the volume of fuel fed by the high-pressure feed pump (3) in a period of time, a device (7) for detecting the fuel quantity injected in the period of time and a comparator (18) for ascertaining a difference between the fuel quantity fed into the high-pressure reservoir and the sum of the fuel quantities detected by the flow quantity measuring device and the fuel quantity injected in the period of time and for forming a signal for display or indication or for varying the operation of the fuel injection system if a difference occurs.

2. The fuel injection system in accordance with claim 1, in which the control unit (7, 7a) has a fuel quantity control device that receives signals for a required load (Q^Yk^Y) and signals for the rpm (n) of the engine from a rpm signal source, by means of said fuel quantity control device, control signals are generated for controlling the electrically controlled injection valves (14), and these control signals are delivered to the comparator (18), to detect the fuel quantity removed from the high-pressure reservoir for the injection, said comparator also receives signals from a device (19) that communicates with the rpm signal source or with an rpm transducer (15), which at least indirectly detects the drive rpm of the high-pressure feed pump, in order to detect a volume of fuel fed by the feed pump.

3. The fuel injection system in accordance with claim 1, in which a flow quantity measuring device has a flow throttle, which is disposed in the fuel return line, and a pressure drop measuring device occurring at the flow throttle determines a measure of the flow quantity.

4. The fuel injection system in accordance with claim 2, in which a flow quantity measuring device has a flow throttle, which is disposed in the fuel return line, and a pressure drop measuring device occurring at the flow throttle determines a measure of the flow quantity.

5. A method for operating a fuel injection system, which comprises feeding a measured quantity of fuel at high pressure into a high-pressure reservoir (1), controlling the high pressure in said high pressure reservoir by a pressure control valve (9), drawing fuel from said high-pressure reservoir for injection via at least one injection valve (14), detecting an intactness of the high-pressure reservoir (1), by comparing the fuel quantity supplied to said high pressure reservoir with the fuel quantity removed from said high pressure reservoir, and if there is a deviation of the quantities from one another, generating a signal for display or indication or for influencing the operation of the fuel injection system.

6. The method in accordance with claim 5, which comprises detecting the fuel quantity supplied to the high-pressure reservoir (1) by detecting the drive rpm of the high-pressure feed pump (3) that pumps the fuel at high pressure, with a geometrically constant feed quantity per revolution of a drive shaft; the detection of the fuel injection quantity in a period of time is effected from signals for controlling the injection quantity; and the detection of the fuel quantity diverted from the high-pressure reservoir (1) in order to maintain the pressure therein is effected by means of a quantity measuring device (17) that measures the diverted fuel quantity.

* * * * *